No. 732,323. Patented June 30, 1903.

UNITED STATES PATENT OFFICE.

ALBERT H. STONE, OF BOSTON, MASSACHUSETTS.

DEPILATORY AND PROCESS OF MAKING IT.

SPECIFICATION forming part of Letters Patent No. 732,323, dated June 30, 1903.

Application filed June 14, 1902. Serial No. 111,733. (No specimens.)

*To all whom it may concern:*

Be it known that I, ALBERT H. STONE, a citizen of the United States, residing at Boston, in the county of Suffolk and State of Massachusetts, have invented a certain new and useful Depilatory and Process of Making It, of which the following is a specification.

The object of the present invention is to provide a depilatory of concentrated strength appropriate to skins and hides of all kinds which when diluted with water by the user shall be of such quality that the solid matter remains in a flaky or flocculent form and which lends itself to ready emulsion.

Another object of the invention is to provide an expeditious, comparatively inexpensive, and reliable method of making the improved depilatory and effecting chemical combination, as well, perhaps, as admixture of its ingredients.

To these and other ends hereinafter set forth the invention, stated in general terms, consists of a depilatory comprising a homogeneous pasty mass, being a crystalline conglomerate of thiosulfates of sodium and calcium and sulfids of sodium and calcium, which latter are probably present in the form of double salts; and it further comprises a method for producing the described depilatory, which consists in subjecting an admixture of quicklime, sodium sulfid, and water to heat in excess of that liberated by the slaking of the lime and with or without agitation during cooling.

A depilatory embodying features of the invention may be prepared by employing six hundred parts, by weight, of quicklime and five thousand five hundred parts, by weight, of a solution of pure sodium sulfid of 28° Baumé, more or less, and containing twenty per cent., more or less, of sodium sulfid. As an illustration of an alternative an impure sodium-sulfid liquor may be used, with addition thereto of the requisite amount of crystallized sodium sulfid to bring the liquor to substantially the condition above described. An example of impure sulfid of sodium is one containing polysulfids of sodium. The proportions and degrees of strength mentioned are appropriate for the production of the product in a pasty condition; but I am aware of the fact that by using a much more concentrated solution of sodium sulfid it is possible to produce the product in a comparatively dry and hard condition. In such case it is probably the water of crystallization, if other supplies are not present in sufficent quantity, which slakes the lime. The application of heat in excess of that liberated by the slaking of the lime to the mixture containing the latter and sodium sulfid and water results in part in a chemical reaction, whereby calcium sulfid or sulfidrate is formed in such proportions as to combine with sodium sulfid or sulfidrate, thus forming probably double salts of these metals, and in addition thereto other portions of the sulfids of sodium and calcium are oxidized to the corresponding thiosulfates under the influence of the heat of reaction and by the oxygen present, as in the air. It may be remarked that sodium sulfid frequently contains thiosulfates, as well as polysulfids. Heat may be applied externally, if thought desirable—for example, by using a hot solution of sodium sulfid or by heating the mixture during the slaking. That a chemical reaction occurs is evidenced by many facts, of which attention may be directed to the following: In the first place the depilating action of this compound is far different from and more effective than that of a simple admixture of sodium sulfid and calcium sulfid or sodium sulfid and water-slaked lime or a mixture of sodium sulfid, water, and quicklime which has not been subjected to heat in excess of that liberated by the slaking of the lime; secondly, the slaked lime appears to be neutralized and changed to innocuous substances in so far as the destructiveness of its action on both the wool and skin is concerned, and, thirdly, when the hot solution of sodium sulfid is brought into contact with the quicklime a considerable evolution of heat occurs, accompanied with generation of steam and violent ebullition.

The described depilatory possesses advantages which I believe to be due to the fact that in the depilatory of my invention the materials, or some of them, are chemically combined and undergo a complete chemical change, in consequence of which they differ in their action on the skin and hides.

Among the advantages possessed by this depilatory it may be stated that by reason of its physical condition it can be satisfactorily packed in concentrated form and safely transported for subsequent dilution and use. Moreover, its character is such that it is not regarded as dangerous cargo by common carriers, whereas sulfid of sodium and unslaked lime are so regarded.

In use this depilatory can be readily reduced by the users by the simple addition of water and is readily emulsifiable and when applied to the skins in the usual manner employed to secure depilation does not in the slightest degree possess any of the injurious properties of either sulfid of sodium alone, sulfid of sodium with water-slaked lime not subjected to heat other than that due to the slaking of the lime, or water-slaked lime alone. The action of these latter compounds is to render the wool and skin less merchantable and less valuable in this that when sulfid of sodium is used alone its slightest contact with the wool will form a hard lump which will neither wash out nor scour out, and the skins are to a greater or less extent impaired in fiber and strength and injured through destruction of the enamel of the grain. When water-slaked lime is added to the sulfid-of-sodium liquor, its application to the skins causes even more and greater objections and injury to both wool and skins, the wool being contaminated with the lime to a greater or less extent, which gives it a harsh and brittle feeling to the touch and will never scour a clear white nor take a bright color in process of manufacture. Since the skins are injured by coming in contact with this mixture whenever they have become tainted in the slightest degree, the complete destruction of the grain of the skin takes place, which renders it almost useless for leather-making purposes and in all cases greatly reduces its commercial value, whereas the use of my depilatory has none of these injurious properties, while in addition it has much stronger depilating properties than sulfid of sodium alone or in combination with water-slaked lime or water-slaked lime alone. Furthermore, the action of the depilatory of the invention is not materially affected by changes of temperature, whereas such is not the case with the ingredients and mixture to which reference has been made. The fact that the result of slaking quicklime with sulfid-of-sodium liquor heated in excess of the heat liberated by the slaking of the lime is in itself an excellent depilatory is an important attribute of the present invention.

To use the described depilatory, it is thinned with water, and by permitting it to stand in water for a considerable time—for example, twelve hours, more or less—the sulfids, or some of them, appear to be converted into sulphydrates and the depilating properties are perceptibly increased, although it is not necessary to let it stand in order to produce commercial results. Merely for the sake of description it may be stated that three parts, by weight, of water to one part, by weight, of the depilatory, more or less, will produce good results on any ordinary hide or skin which it is desired to depilate. The water-thinned depilatory may be applied to the flesh side of the hide or skin, and the latter being folded with the flesh side in is laid away for a few hours, whereupon the hair or wool can be readily removed. As a matter of convenience the thinned depilatory can be conveniently applied with a vegetable-fiber brush, and it is well to stir it prior to its application.

It will be obvious to those skilled in the art to which the invention relates that modifications may be made in proportions and in the mode of procedure without departing from the spirit of the invention; but, Having thus ascertained the nature and objects of the invention, what I claim as new, and desire to secure by Letters Patent, is—

1. As a depilatory the result produced by slaking quicklime with a hot solution of sodium sulfid, substantially as described.

2. The process of making a depilatory which consists in subjecting an admixture of lime, sodium sulfid and water to heat in excess of that liberated by the slaking of the lime, substantially as described.

In testimony whereof I have hereunto signed my name.

ALBERT H. STONE.

In presence of—
WM. J. JACKSON,
FRANK T. KALAS.